US011194652B2

(12) United States Patent
Nakamura

(10) Patent No.: US 11,194,652 B2
(45) Date of Patent: Dec. 7, 2021

(54) COMMUNICATION SYSTEM

(71) Applicant: Yazaki Corporation, Tokyo (JP)

(72) Inventor: Yoshihide Nakamura, Susono (JP)

(73) Assignee: YAZAKI CORPORATION, Tokyo (JP)

(*) Notice: Subject to any disclaimer, the term of this patent is extended or adjusted under 35 U.S.C. 154(b) by 210 days.

(21) Appl. No.: 16/285,880

(22) Filed: Feb. 26, 2019

(65) Prior Publication Data
US 2019/0332464 A1 Oct. 31, 2019

(30) Foreign Application Priority Data

Apr. 25, 2018 (JP) .............................. JP2018-084308

(51) Int. Cl.
G06F 11/10 (2006.01)
B60R 16/023 (2006.01)
G06F 7/58 (2006.01)
G06F 9/38 (2018.01)

(52) U.S. Cl.
CPC ............ G06F 11/10 (2013.01); B60R 16/023 (2013.01); G06F 7/588 (2013.01); G06F 9/3877 (2013.01)

(58) Field of Classification Search
CPC ........ G06F 11/10; G06F 7/588; G06F 9/3877; B60R 16/023
See application file for complete search history.

(56) References Cited

U.S. PATENT DOCUMENTS

| 2003/0135678 A1* | 7/2003 | Andre ................. G06F 13/4217 710/243 |
| 2005/0289269 A1 | 12/2005 | Nakayama et al. |
| 2007/0253413 A1* | 11/2007 | Citron ..................... H04L 41/00 370/389 |
| 2011/0091038 A1* | 4/2011 | Thueringer ........... G06F 21/445 380/255 |
| 2017/0220096 A1* | 8/2017 | Lin .......................... G06F 1/266 |
| 2018/0143935 A1* | 5/2018 | Cox ..................... G06F 13/4282 |
| 2019/0042495 A1* | 2/2019 | Foust .................. G06F 12/0623 |
| 2019/0075421 A1* | 3/2019 | Fogg ...................... H04W 64/00 |

FOREIGN PATENT DOCUMENTS

| CA | 2714800 A1 * | 5/2011 | ............. H04L 41/12 |
| CN | 106134157 A * | 11/2016 | ............. H04W 4/02 |
| JP | 2006-040261 A | 2/2006 | |
| JP | 2010-184575 A | 8/2010 | |
| KR | 101630729 B1 * | 6/2016 | ......... H04L 61/2007 |

* cited by examiner

Primary Examiner — Peter D Nolan
Assistant Examiner — Tanya C Sienko
(74) Attorney, Agent, or Firm — Sughrue Mion, PLLC

(57) ABSTRACT

The in-vehicle network includes a plurality of slave devices and a master device that communicates with the plurality of slave devices. The plurality of slave devices generates slave unique information as random information upon setting ID, and transmits the generated slave unique information. When all the slave unique information received from the plurality of slave devices are different from each other, the master device sets the ID based on each slave unique information. When the slave unique information received from the plurality of slave devices matches, the master device transmits a regeneration command to regenerate the slave unique information. Upon receiving the regeneration command, the slave device regenerates the slave unique information.

9 Claims, 5 Drawing Sheets

COMMUNICATION SYSTEM

TECHNICAL FIELD

The present invention relates to a communication system.

BACKGROUND ART

Various loads such as lamps and power windows are mounted on vehicles such as passenger cars and freight cars. A technique has been proposed for controlling the loads by using communication between a slave device to which a plurality of loads is connected and a master device controlling a plurality of slave devices.

In the above technique, it is necessary to set identification information (ID) in a plurality of slave devices to which a plurality of loads is connected, respectively.

As a method for setting the ID, for example, one described in Patent Literature 1 has been proposed. In the above-described ID setting method, the master device sends an ID to the slave device every time when a slave device not set with ID is connected to the in-vehicle LAN, and the slave device stores the ID.

However, since the ID is set every connection of the slave device, there is a problem that it takes time to set the ID. Also, since the order of IDs sent by the master device to the slave device is fixed, there is also a problem that if the connection order of the slave device to the in-vehicle LAN is different, an ID different from the original ID is set.

PRIOR ART DOCUMENT

Patent Literature

Patent Literature 1: JP 2010-184575 A

SUMMARY OF INVENTION

Technical Problem

The present invention has been made in view of the above-described background, and it is an object of the present invention to provide a communication system capable of shortening setting time of identification information and reducing erroneous setting.

Solution to Problem

According to a first aspect of the present invention, there is provided a communication system including:
a plurality of slave devices; and
a master device that communicates with the plurality of slave devices,
wherein each of the plurality of slave devices includes: a generation unit that generates random information when setting identification information; and a first transmission unit that transmits generated random information,
wherein the master device includes: a first setting unit that sets the identification information based on each piece of the random information when all the pieces of the random information received from the plurality of slave devices are different; and a second transmission unit that transmits a regeneration command of the random information if the random information received from the plurality of slave devices includes information equivalent to each other, and
wherein the generation unit generates the random information again upon receiving the regeneration command.

Preferably, there is provided the communication system, wherein a plurality of types of slave device groups each including the plurality of slave devices are provided,
Wherein the master device is provided for each of the plurality of slave device groups, and includes a switch provided for each of the plurality of slave device groups and supplying power to the corresponding slave device group, and
wherein the master device turns on the switches sequentially and causes the first setting unit to sequentially set the identification information of the plurality of slave devices for each of the slave device groups.

Preferably, there is provided the communication system, wherein the first setting unit sets the identification information corresponding to each piece of the random information,
wherein the master device includes a third transmitting unit that adds the set identification information to the random information and transmits the random information, and
wherein the plurality of slave devices have a second setting unit that sets the received identification information as its identification information when receiving the random information generated by itself.

Preferably, there is provided the communication system, wherein a plurality of the master devices is installed in a vehicle, and
wherein the identification information includes installation information indicating an installation position of the master device in the vehicle.

Preferably, there is provided the communication system, wherein the slave device generates the random information if its own identification information is predetermined initial identification information.

Preferably, there is provided the communication system, wherein the first transmission unit adds the initial identification information to the random information and transmits the added random information, and
wherein upon receiving the initial identification information, the master device causes the first setting unit to set the identification information.

Effect of the Invention

According to the aspect described above, it is unnecessary to assign the identification information every time the slave device is connected, therefore it is possible to shorten the setting time of the identification information and reduce the erroneous setting.

DESCRIPTION OF EMBODIMENTS

Figure 1:
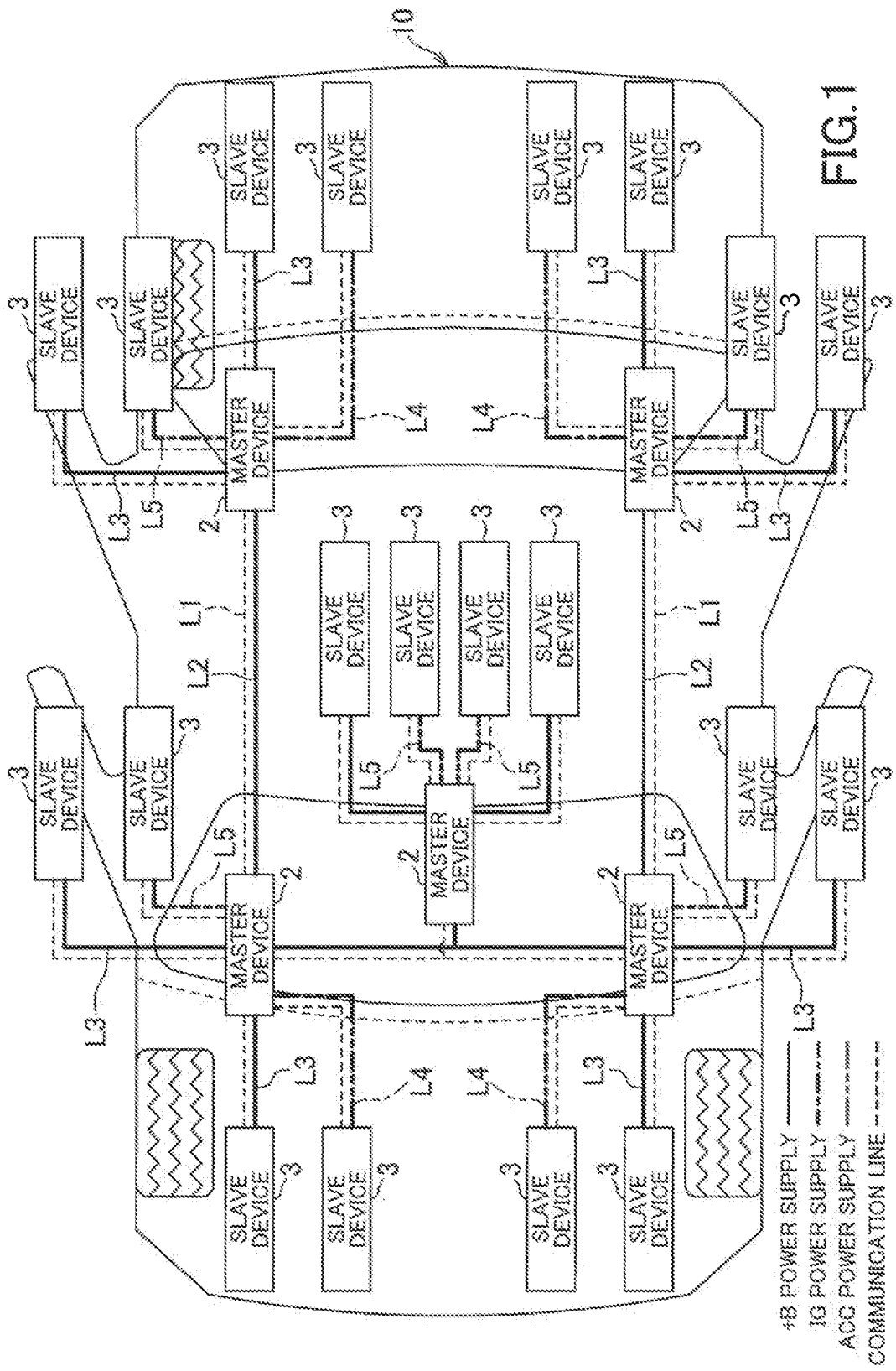
FIG. 1 is a block diagram showing an in-vehicle network as a communication system of the present invention.
Figure 2:
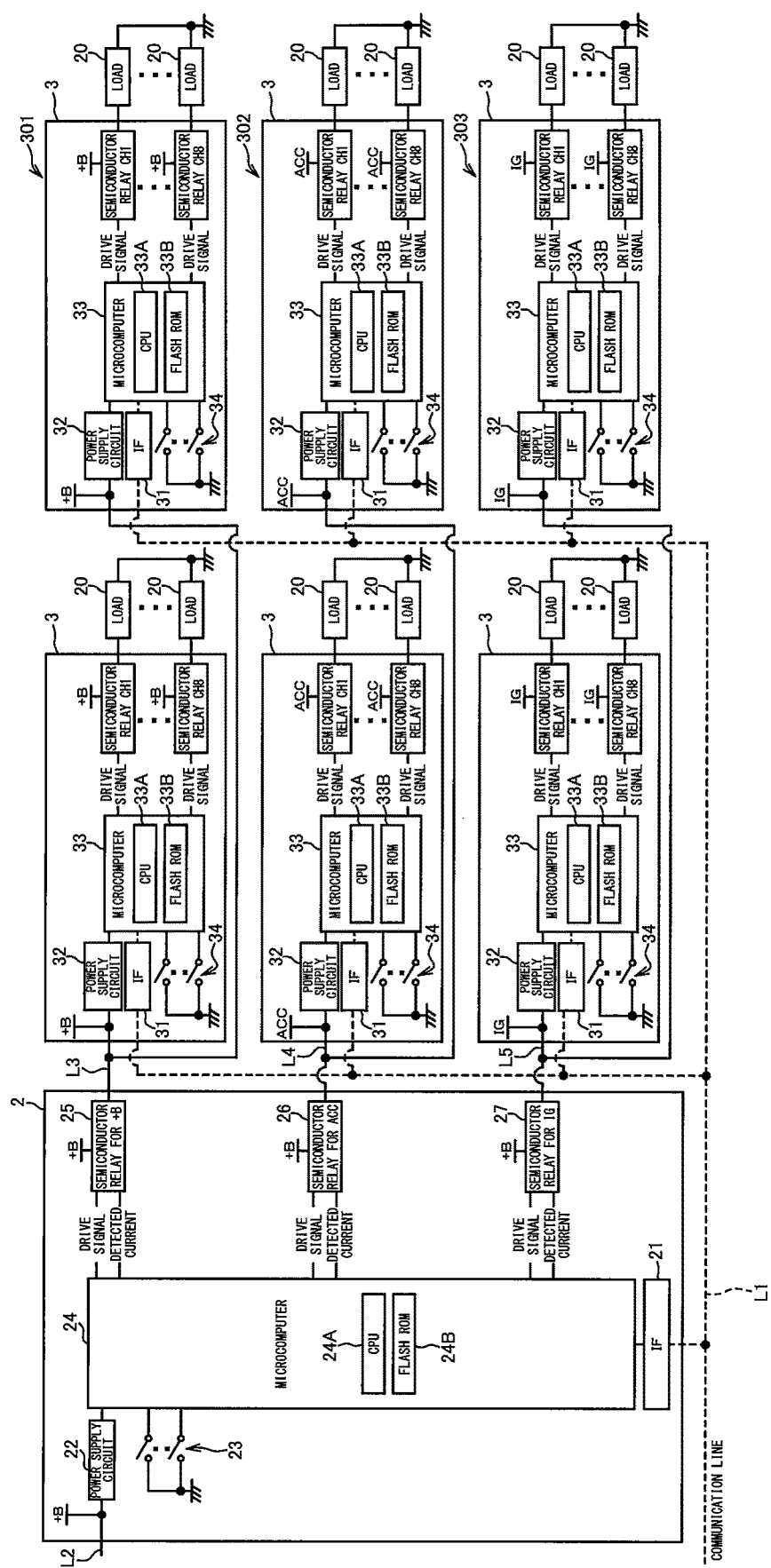
FIG. 2 is a block diagram showing a configuration of a master device and a slave device that constitute the in-vehicle network shown in FIG. 1.

Hereinafter, an embodiment of the present invention will be described with reference to FIGS. 1 and 2. FIG. 1 is a block diagram showing an in-vehicle network 1 as a communication system of the present invention. FIG. 2 is a block diagram showing a configuration of a master device 2 and a slave device 3 constituting the in-vehicle network 1 shown in FIG. 1.

The in-vehicle network 1 shown in FIG. 1 is mounted in a vehicle 10. The in-vehicle network 1 includes a plurality of master devices 2 and a plurality of slave devices 3. The plurality of master devices 2 are arranged in each area of the vehicle 10. In the present embodiment, the master devices 2 are disposed at five locations, the center of the front of the vehicle 10, the right side of the front, the left side of the front, the right side of the rear, and the left side of the rear.

The five master devices 2 are communicably connected to each other through a communication line L1. Further, the master devices 2 are connected to each other via a +B power supply line L2 connected to a battery (not shown), and power is supplied via the +B power supply line L2.

Further, each of the five master devices 2 is communicably connected to a plurality of slave devices 3 arranged in the own area through a communication line L1. The master device 2 and the slave devices 3 are connected one to many. The master device 2 controls the operations of the plurality of slave devices 3 by communicating with the plurality of slave devices 3. The slave device 3 is connected to a plurality of loads 20 (FIG. 2) such as lamps, seat motors, door motors and the like disposed in the own area, and controls the driving of the loads 20 in accordance with communication with the master device 2.

The plurality of slave devices 3 is provided separately for +B, for ACC, and for IG. The slave device 3 for +B is connected to the loads 20 that can be driven at all times. A plurality of slave devices 3 for +B is provided, and the plurality of slave devices 3 for +B constitutes a slave device group 301 for +B.

The slave device 3 for ACC is connected to the loads 20 which can be driven when an accessory is used. A plurality of slave devices 3 for ACC is provided, and the plurality of ACC slave devices 3 constitutes a slave device group 302 for ACC.

The slave device 3 for IG is connected to the loads 20 that can be driven when using an ignition. A plurality of slave devices 3 for IG is provided, and the plurality of slave devices 3 for IG constitutes a slave device group 303 for IG.

Next, a configuration of the above-described master device 2 will be explained. The plurality of master devices 2 has the same configuration, and each of the plurality of master devices 2 has an interface (hereinafter referred to as I/F) 21, a power supply circuit 22, a plurality of local SWs 23, a microcomputer 24, a semiconductor relay 25 for +B as a switch, a semiconductor relay 26 for ACC, and a semiconductor relay 27 for IG.

The I/F 21 is a communication interface for communicating with another master device 2 and a plurality of slave devices 3. The I/F 21 is an interface capable of inputting and outputting signals corresponding to various communications (CAN, LIN, and other communication methods). The power supply circuit 22 is a circuit that generates a power supply for the microcomputer 24 to be described later from the power supplied from the +B power supply line L2 and supplies power to the microcomputer 24. The local SW 23 is operated by the user to operate the load 20.

The microcomputer 24 is composed of a well-known CPU (Central Processing Unit) 24A and a flash ROM (Read Only Memory) 24B. The CPU 24A controls the entire master device 2 and performs various processes according to the processing program. The flash ROM 24B is a memory for storing the ID of the slave device 3 connected to the master device 2, the program of processing to be executed by the CPU 24A, and the like.

The semiconductor relays 25 to 27 are provided corresponding to the plurality of slave device groups 301 to 303. The semiconductor relay 25 for +B is connected to the slave device 3 for +B via the +B power supply line L3. The semiconductor relay 25 for +B is turned on when a drive signal is output from the microcomputer 24, and supplies power from the +B power supply line L2 to the slave device 3 for +B via the +B power supply line L3.

The semiconductor relay 26 for ACC is connected to the slave device 3 for ACC via the ACC power supply line L4. The semiconductor relay 26 for ACC is turned on when a drive signal is output from the microcomputer 24, and supplies power from the +B power supply line L2 to the slave device 3 for ACC via the ACC power supply line L4.

The semiconductor relay 27 for IG is connected to the slave device 3 for IG via the IG power supply line L5. The semiconductor relay 27 for IG turns on when a drive signal is output from the microcomputer 24, and supplies power from the +B power supply line L2 to the slave device 3 for IG via the IG power supply line L5.

In the present embodiment, the +B power supply line L3, the ACC power supply line L4, and the IG power supply line L5 are branched into two and are connected to the two slave devices 3, but the present invention is not limited to this. The +B power supply line L3, the ACC power supply line L4, and the IG power supply line L5 may be branched into three or more and may be connected to three or more slave devices 3.

Incidentally, the semiconductor relays 25 to 27 have a current detection function for detecting a current flowing in the semiconductor relays 25 to 27, and the detected currents are input to the microcomputer 24.

Next, the configuration of the above-described slave device 3 will be explained. The plurality of slave devices 3 has the same configuration and each has an I/F 31, a power supply circuit 32, a microcomputer 33, a plurality of local SWs 34, and a plurality of semiconductor relays CH1 to CH8. The I/F 31 is an interface for communicating with the master device 2, and capable of inputting and outputting signals corresponding to various communications (CAN, LIN, and other communication methods). The power supply circuit 32 is a circuit that generates a power supply for a microcomputer 33 to be described later from power supplied from the +B power supply line L3, the ACC power supply line L4, and the IG power supply line L5 and supplies power to the microcomputer 33.

The microcomputer 33 is composed of a CPU 33A and a flash ROM 33B. The CPU 33A controls the entire slave device 3 and performs various processes according to the processing program. The flash ROM 33B is a memory for storing an initial ID, a program, a variable, and a setting value of processing to be executed by the CPU 33A, and in the initial state, the same contents are written in all the slave devices 3. The initial ID is a temporary ID, and a transmission initial ID and a reception initial ID are set.

The processing program of the CPU 33A includes a communication program for communicating with the master device 2 connected via the communication line L1 and a system operation program necessary for system operation. The operation program of the load 20 is not written in the flash ROM 33B in the initial state, but is written after setting the ID.

The plurality of local SWs 34 are connected to the microcomputer 33 and input ON/OFF information to the microcomputer 33. The plurality of semiconductor relays CH1 to CH8 are connected between the microcomputer 33 and the loads 20, respectively, and are turned on and off in accordance with a drive signal from the microcomputer 33. When the semiconductor relays CH1 to CH8 in the slave device 3 for +B turn on, the power from the +B power supply line L3 is supplied to the loads 20. When the semiconductor relays CH1 to CH8 in the slave device 3 for ACC are turned on, the power from the ACC power supply line L4 is supplied to the loads 20. When the semiconductor relays CH1 to CH8 in the slave device 3 for IG are turned on, the power from the IG power supply line L5 is supplied to the loads 20.

Further, the semiconductor relays CH1 to CH8 have a current detection function for detecting the current flowing in the semiconductor relays CH1 to CH8, and the detected currents are input to the microcomputer 33. In the present embodiment, the number of the semiconductor relays CH1 to CH8 provided in the slave device 3 is eight as an example, but the present invention is not limited to this and any number may be used. All the slave devices 3 have the same number of semiconductor relays CH1 to CH8.

Next, the bit assignment of signals exchanged between the master device 2 and the slave device 3 will be described with reference to Table 1 below.

Bit4 is allocated to the transmission/reception information, becomes "1" when the slave device 3 transmits to the master device 2, and becomes "0" when the slave device 3 receives from the master device 2.

Bit3 to bit0 are allocated to the slave type information. The slave type information is information that is allocated without overlapping with a plurality of slave devices 3 connected to the same master device 2 (but may overlap between the slave devices 3 connected to different master devices 2).

Bit7 to bit0 following the ID indicate load control information after ID setting. Bit 7 to bit 0 are allocated to the semiconductor relays CH8 to CH1 respectively. When each bit n (n is any integer from 0 to 7) is "0", it represents "off" of the semiconductor relay CH n+1 assigned to the bit n.

TABLE 1

| | | | | | ID | | | | | |
|---|---|---|---|---|---|---|---|---|---|---|
| bit10 | bit9 | bit8 | bit7 | bit6 | bit5 | bit4 | bit3 | bit2 | bit1 | bit0 |
| +B power source: 01 ACC power source: 10 IG power source: 11 | | front: 01 rear: 10 center: 11 | | right: 01 left: 10 center: 11 | | receive: 0 send: 1 | slave1: 0001 slave2: 0002 ... slave n: XXXX | | | |

| | byte Before ID setting: slave unique information generation request/slave unique information After ID setting: load control information | | | | | | | |
|---|---|---|---|---|---|---|---|---|
| | bit7 | bit6 | bit5 | bit4 | bit3 | bit2 | bit1 | bit0 |
| Before ID setting | slave unique information generation request Y: 1 N: 0 | | | slave unique information 00000000~11111111 | | | | |
| After ID setting | CH8 ON: 1 CH8 OFF: 0 | CH7 ON: 1 CH7 OFF: 0 | CH6 ON: 1 CH6 OFF: 0 | CH5 ON: 1 CH5 OFF: 0 | CH4 ON: 1 CH4 OFF: 0 | CH3 ON: 1 CH3 OFF: 0 | CH2 ON: 1 CH2 OFF: 0 | CH1 ON: 1 CH1 OFF: 0 |

As shown in Table 1 above, the first bit10 to bit0 represents the identification information (ID) of the slave device 3. The identification information is allocated to all the slave devices 3 arranged in the vehicle 10 without overlapping. The identification information is composed of drive power information, installation information, transmission/reception information, and slave type information.

Bit10 to bit9 are allocated to the drive power information, and become "01" if the slave device 3 is connected to the +B power supply line L3, "10" if connected to the ACC power supply line L4, and "11" if connected to the IG power supply line L5.

Bit8 to bit5 are allocated to the installation information. Bit8 to bit7 represent installation positions in the traveling direction of the vehicle, and become "01" if the installation position of the slave device 3 is on the front side of the vehicle, "10" if on the rear side, and "11" if at the center in the traveling direction. Bit6 to bit5 represent installation positions in the left-right direction of the vehicle 10, and become "01" if the installation position of the slave device 3 is on the right side of the vehicle 10, "10" in the case of the left side, and "11" in the case of the center in the left-right direction.

When each bit n (n is any integer from 0 to 7) is "1", it represents "on" of the semiconductor relay CH n+1 assigned to the bit n.

Before ID setting, bit 7 indicates the presence or absence of a slave unique information generation request, which will be described later, and bit 6 to bit 0 indicate slave unique information described later.

Figure 3:
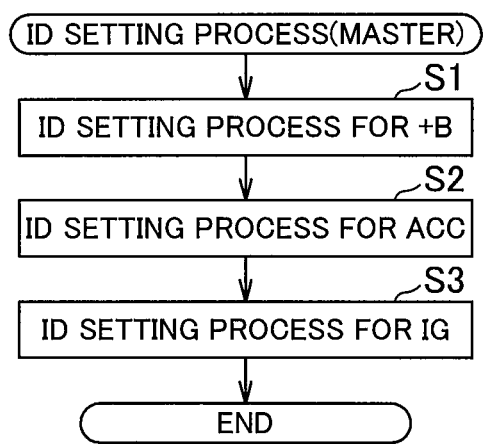
FIG. 3 is a flowchart showing an ID setting process procedure executed by the master device shown in FIG. 1.

Next, the ID setting operation of the in-vehicle network 1 having the above-described configuration will be described with reference to the flowcharts of FIGS. 3 to 5. Incidentally, in the initial state (ID is not set), the same initial ID (initial reception ID, initial transmission ID) is set in all the slave devices 3 and stored in the ID area of the flash ROM 33B.

There are two types of IDs set in the slave device 3: a reception ID and a transmission ID, but since the difference between the two is only the transmission/reception information (bit4 of ID) as shown in Table 1, If either is determined, the transmission/reception ID is naturally determined. In the present embodiment, the setting of the reception ID will be described, and as the initial reception ID, it is assumed that "00000001111" which is "0" for bit10 to bit4 and "1" for bit3 to bit0 is set as shown in the following Table 2.

TABLE 2

| | | | ID | | | | | | | |
|---|---|---|---|---|---|---|---|---|---|---|
| drive power information | | installation information | | | | transmission/ reception information | slave type information | | | |
| bit10 | bit9 | bit8 | bit7 | bit6 | bit5 | bit4 | bit3 | bit2 | bit1 | bit0 |
| 0 | 0 | 0 | 0 | 0 | 0 | 0 | 1 | 1 | 1 | 1 |

Further, in the initial state, installation information is previously stored in the flash ROM 24B or the like in all the master devices 2. For example, in the flash ROM 24B of the master device 2 installed on the front right side of the vehicle 10, "0101" is previously stored as installation information.

First, the microcomputer 24 of the master device 2 (hereinafter sometimes simply referred to as the master device 2) executes the ID setting process shown in FIG. 3 after activation, performs ID setting process for +B (step S1), ID setting process for ACC (step S2), and ID setting process for IG (step S3) sequentially. The ID setting process for +B is a process of setting the ID of the slave device 3 for +B. The ID setting process for ACC is a process of setting the ID of the slave device 3 for ACC. The ID setting process for the IG is a process for setting the ID of the slave device 3 for IG.

Figure 4:
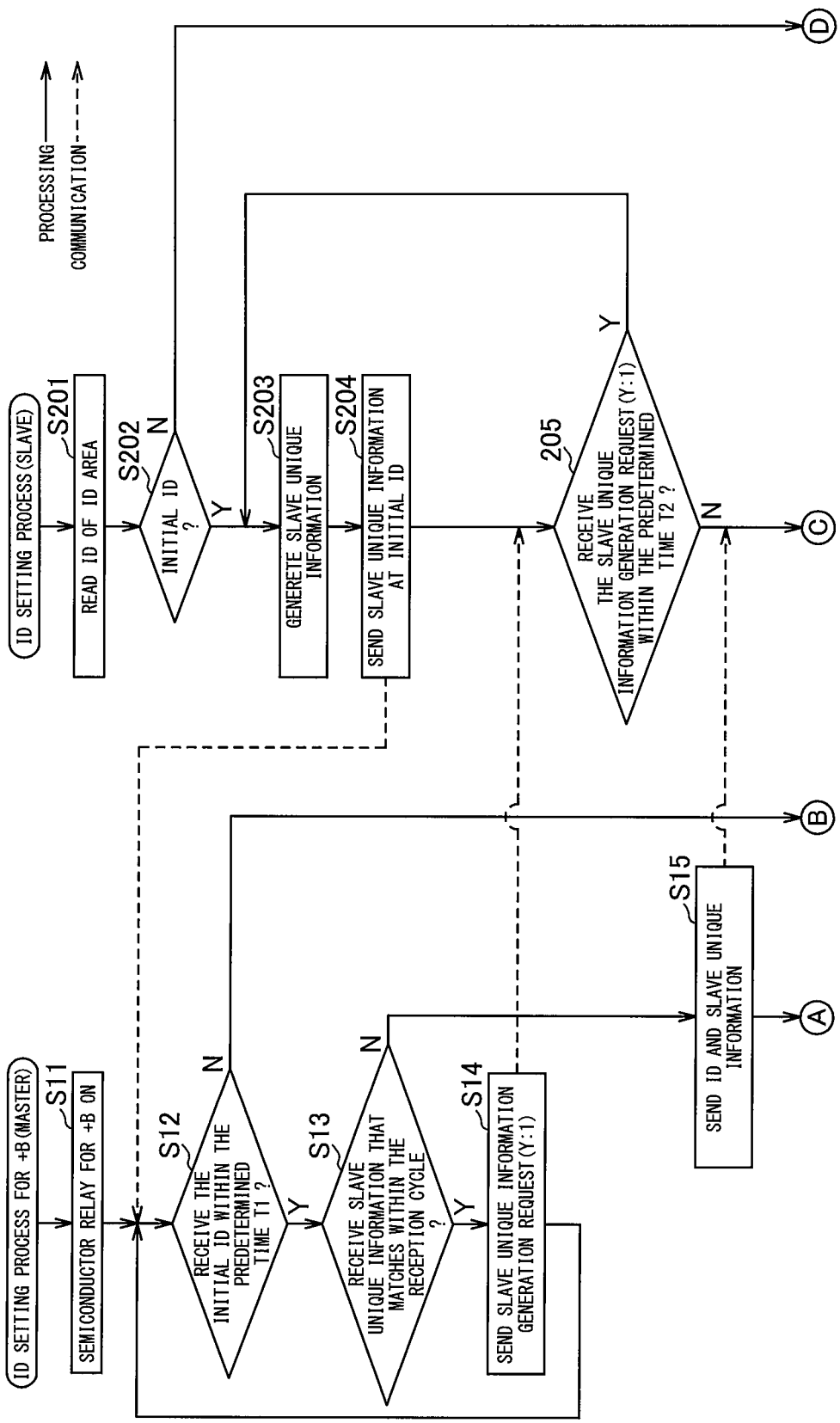
FIG. 4 is a flowchart showing an ID setting process procedure for +B executed by the master device and the slave device shown in FIG. 1.
Figure 5:
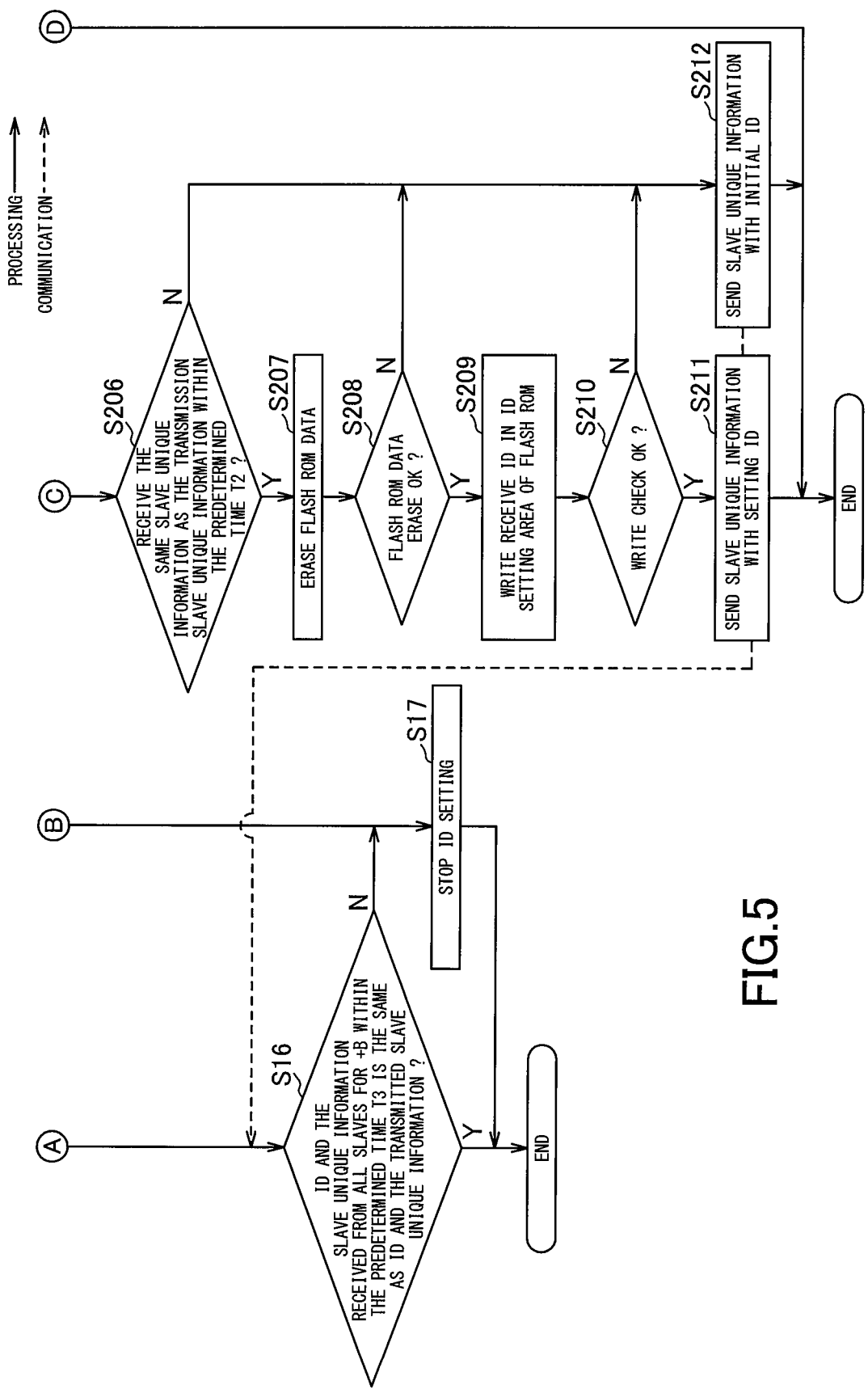
FIG. 5 is a flowchart showing an ID setting process procedure for +B executed by the master device and the slave device shown in FIG. 1.

In the ID setting process for +B, the master device 2 turns on the semiconductor relay 25 for +B (step S11 in FIG. 4). Power is supplied to the slave device 3 for +B in response to turning on of the semiconductor relay 25 for +B.

The microcomputer 33 of the slave device 3 for +B (hereinafter sometimes simply referred to as the slave device 3) is activated when power is supplied and executes the ID setting process shown in FIG. 4. In the ID setting process, the slave device 3 first reads the ID stored in the ID area of the flash ROM 33B (step S201). Next, the slave device 3 judges whether or not the read ID is the initial ID "00000001111" (step S202).

If the read ID is not the initial ID (N in step S202), the slave device 3 immediately determines that the ID has already been set and ends the ID setting process. On the other hand, if the read ID is the initial ID (Y in step S202), the CPU 33A of the slave device 3 functions as a generation unit and generates 7-bit slave unique information (random information) (step S203).

In step S203, the slave device 3 executes a generation program such as a PN code typified by an M series code, for example, to generate a random bit string.

Next, the CPU 33A of the slave device 3 functions as a first transmission unit, gives an initial ID, and transmits the slave unique information generated in step S203 (step S204). For example, if "0111100" is generated as the slave unique information, the slave device 3 transmits a signal of a bit string shown in Table 3 below. That is, the ID is "00000001111" (initial ID), the bit 7 representing slave unique information generation request is "0" in the byte, and the bit6 to 0 representing slave inherent information in the byte is "0111100".

TABLE 3

| | | | ID | | | | | | | |
|---|---|---|---|---|---|---|---|---|---|---|
| drive power information | | installation information | | | | transmission/ reception information | slave type information | | | |
| bit10 | bit9 | bit8 | bit7 | bit6 | bit5 | bit4 | bit3 | bit2 | bit1 | bit0 |
| 0 | 0 | 0 | 0 | 0 | 0 | 0 | 1 | 1 | 1 | 1 |

| byte | | | | | | | |
|---|---|---|---|---|---|---|---|
| request | slave unique information | | | | | | |
| bit7 | bit6 | bit5 | bit4 | bit3 | bit2 | bit1 | bit0 |
| 0 | 0 | 1 | 1 | 1 | 1 | 0 | 0 |

Each slave device 3 executes step S204, whereby the slave unique information generated by each slave device 3 is transmitted to the master device 2.

When the master device 2 receives the slave unique information assigned with the initial ID within a predetermined time T1 (Y in step S12) after turning on the semiconductor relay 25 for +B in step S11, the master device 2 proceeds to the next step S13.

When the ID of the slave device 3 is not set, the master device 2 can receive the slave unique information from all the slave devices 3 connected to the master device 2 within a reception cycle (for example, 100 ms). In step S13, the master device 2 determines whether there is a match with the plurality of slave unique information received within the reception cycle.

For example, as shown in the following Table 4, if there is a match among even one set of slave unique information (Y in step S13), the CPU 24A of the master device 2 functions as a second transmission unit and transmits slave unique information generation request (regeneration command) (step S14), and returns to step S12.

TABLE 4

| slave device | ID | | | | | | | | | | |
|---|---|---|---|---|---|---|---|---|---|---|---|
| | drive power information | | installation information | | | | transmission/ reception information | slave type information | | | |
| | bit10 | bit9 | bit8 | bit7 | bit6 | bit5 | bit4 | bit3 | bit2 | bit1 | bit0 |
| 3A | 0 | 0 | 0 | 0 | 0 | 0 | 0 | 1 | 1 | 1 | 1 |
| 3B | 0 | 0 | 0 | 0 | 0 | 0 | 0 | 1 | 1 | 1 | 1 |
| 3C | 0 | 0 | 0 | 0 | 0 | 0 | 0 | 1 | 1 | 1 | 1 |

| slave device | byte | | | | | | | |
|---|---|---|---|---|---|---|---|---|
| | request | slave unique information | | | | | | |
| | bit7 | bit6 | bit5 | bit4 | bit3 | bit2 | bit1 | bit0 |
| 3A | 0 | 0 | 1 | 1 | 1 | 1 | 0 | 0 |
| 3B | 0 | 1 | 0 | 1 | 1 | 0 | 1 | 0 |
| 3C | 0 | 0 | 1 | 1 | 1 | 1 | 0 | 0 |

Table 4 shows an example of the slave unique information transmitted from the three slave devices 3A to 3C connected to the master device 2. In the example shown in Table 4, the slave unique information generated by each of the slave devices 3A and 3C matches. Incidentally, as a slave unique information generation request, a signal of a bit string shown in the following Table 5 is transmitted. That is, the ID is "00000001111" (initial ID), the bit7 representing slave unique information generation request in the byte is "1", and the bits 6 to 0 representing slave unique information in the byte are "0".

TABLE 5

| ID | | | | | | | | | | | |
|---|---|---|---|---|---|---|---|---|---|---|---|
| drive power information | | installation information | | | | transmission/ reception information | slave type information | | | | |
| bit10 | bit9 | bit8 | bit7 | bit6 | bit5 | bit4 | bit3 | bit2 | bit1 | bit0 | |
| 0 | 0 | 0 | 0 | 0 | 0 | 0 | 1 | 1 | 1 | 1 | |

| byte | | | | | | | |
|---|---|---|---|---|---|---|---|
| request | slave unique information | | | | | | |
| bit7 | bit6 | bit5 | bit4 | bit3 | bit2 | bit1 | bit0 |
| 1 | 0 | 0 | 0 | 0 | 0 | 0 | 0 |

When the slave device 3 receives the slave unique information generation request within the predetermined time T2 after transmitting the slave unique information (Y in step S205), the slave device 3 returns to step S203 again and regenerates the slave unique information.

On the other hand, as shown in the following Table 6, for example, if all the received slave unique information do not match each other (N in step S13), the master device 2 proceeds to the next step S15.

TABLE 6

| slave device | ID | | | | | | | | | | |
|---|---|---|---|---|---|---|---|---|---|---|---|
| | drive power information | | installation information | | | | transmission/ reception information | slave type information | | | |
| | bit10 | bit9 | bit8 | bit7 | bit6 | bit5 | bit4 | bit3 | bit2 | bit1 | bit0 |
| 3A | 0 | 0 | 0 | 0 | 0 | 0 | 0 | 1 | 1 | 1 | 1 |
| 3B | 0 | 0 | 0 | 0 | 0 | 0 | 0 | 1 | 1 | 1 | 1 |
| 3C | 0 | 0 | 0 | 0 | 0 | 0 | 0 | 1 | 1 | 1 | 1 |

TABLE 6-continued

| slave device | request | slave unique information | | | | | | |
|---|---|---|---|---|---|---|---|---|
| | bit7 | bit6 | bit5 | bit4 | bit3 | bit2 | bit1 | bit0 |
| 3A | 0 | 0 | 1 | 1 | 1 | 1 | 0 | 0 |
| 3B | 0 | 1 | 0 | 1 | 1 | 0 | 1 | 0 |
| 3C | 0 | 1 | 1 | 0 | 1 | 0 | 0 | 1 |

Table 6 shows an example of the slave unique information transmitted from the three slave devices 3A to 3C connected to the master device 2. As shown in Table 6, all the slave unique information generated by each of the slave devices 3A to 3C is different from each other.

In the next step S15, the CPU 24A of the master device 2 functions as a first setting unit and a third transmission unit, sets an ID corresponding to the discrete slave unique information, and transmits set ID and the slave unique information corresponding to the set ID. Step S15 will be described in detail. As shown in the following Table 7, the master device 2 associates the received slave unique information with the slave type information. In the example shown in Table 7, the slave type information is assigned in order from "1" in ascending order of slave unique information.

TABLE 7

| slave device | ID | | | | | | | | | | |
|---|---|---|---|---|---|---|---|---|---|---|---|
| | drive power information | | | installation information | | | transmission/ reception information | slave type information | | | |
| | bit10 | bit9 | bit8 | bit7 | bit6 | bit5 | bit4 | bit3 | bit2 | bit1 | bit0 |
| 3A | 0 | 0 | 0 | 0 | 0 | 0 | 0 | 1 | 1 | 1 | 1 |
| 3B | 0 | 0 | 0 | 0 | 0 | 0 | 0 | 1 | 1 | 1 | 1 |
| 3C | 0 | 0 | 0 | 0 | 0 | 0 | 0 | 1 | 1 | 1 | 1 |

| slave device | request | slave unique information | | | | | | |
|---|---|---|---|---|---|---|---|---|
| | bit7 | bit6 | bit5 | bit4 | bit3 | bit2 | bit1 | bit0 |
| 3A | 0 | 0 | 1 | 1 | 1 | 1 | 0 | 0 |
| 3B | 0 | 1 | 0 | 1 | 1 | 0 | 1 | 0 |
| 3C | 0 | 1 | 1 | 0 | 1 | 0 | 0 | 1 |

| slave device | slave type information | | | |
|---|---|---|---|---|
| | bit3 | bit2 | bit1 | bit0 |
| 3A | 0 | 0 | 0 | 0 |
| 3B | 0 | 0 | 1 | 0 |
| 3C | 0 | 0 | 1 | 1 |

For example, among the three slave unique information, the slave unique information "0111100" transmitted from the slave apparatus 3A is the lowest, so that the lowest slave type information "0001" is associated. Next, since the slave unique information "1011010" transmitted from the slave device 3B is the next low, "0010" obtained by adding 1 to "0001" is associated as slave type information. Next, since the slave unique information "1101001" transmitted from the slave device 3C is the next low, "0011" obtained by adding 1 to "0010" is associated as slave type information.

Further, as shown in Table 8, the master device 2 transmits driving power information, installation information, and transmission/reception information "0" to each of slave type information and transmits slave unique information corresponding to each ID.

TABLE 8

| slave device | ID | | | | | | | | | | |
|---|---|---|---|---|---|---|---|---|---|---|---|
| | drive power information | | installation information | | | | transmission/ reception information | | slave type information | | |
| | bit10 | bit9 | bit8 | bit7 | bit6 | bit5 | bit4 | bit3 | bit2 | bit1 | bit0 |
| 3A | 0 | 1 | 0 | 1 | 0 | 1 | 0 | 0 | 0 | 0 | 1 |
| 3B | 0 | 1 | 0 | 1 | 0 | 1 | 0 | 0 | 0 | 1 | 0 |
| 3C | 0 | 1 | 0 | 1 | 0 | 1 | 0 | 0 | 0 | 1 | 1 |

| slave device | byte | | | | | | | |
|---|---|---|---|---|---|---|---|---|
| | request | slave unique information | | | | | | |
| | bit7 | bit6 | bit5 | bit4 | bit3 | bit2 | bit1 | bit0 |
| 3A | 0 | 0 | 1 | 1 | 1 | 1 | 0 | 0 |
| 3B | 0 | 1 | 0 | 1 | 1 | 0 | 1 | 0 |
| 3C | 0 | 1 | 1 | 0 | 1 | 0 | 0 | 1 |

The master device 2 assigns "01" indicating the +B power supply as the drive power information. Further, the master device 2 assigns pre-stored installation information "0101".

Upon receiving the same slave unique information as the slave unique information generated and transmitted by the slave device 3 within the predetermined time T2 (Y in step S206 of FIG. 5), the slave device 3 erases the initial ID from the ID area of the flash ROM 33B (Step S207). When the erasing of the ID area of the flash ROM 33B succeeds (Y in step S208), the CPU 33A of the slave device 3 functions as a second setting unit, and writes the ID transmitted together with the same slave unique information as the slave unique information transmitted by the CPU 33A in the flash ROM 33B as a reception ID (step S209).

Next, when the received ID matches the reception ID written in the flash ROM 33B and the writing is judged successful (Y in step S210), the slave device 3 transmits the slave unique information with the written ID (Step S211), and ends the process.

When the ID and the slave unique information received from all the slave devices 3 and the ID and the slave unique information transmitted in step S15 match within a predetermined time T3 from step S15 in FIG. 4 (step Y in S16), the ID setting process for +B is terminated.

On the other hand, when the slave device 3 cannot receive the same slave unique information as the slave unique information transmitted within the predetermined time T2 (N in Step S206), when the erasure of the flash ROM 33B fails (N in Step S208), or when writing of the ID fails (N in step S210), the slave unique information is transmitted with the initial ID (step S212), and the ID setting process is terminated.

When the master device 2 cannot receive the initial ID within the predetermined time T1 (N in step S12 in FIG. 4), or when the master device 2 cannot receive the ID and the slave unique information matching the ID and the slave unique information transmitted in step S15 within the predetermined time T3 (N in step S16), the ID setting is canceled (step S17), and the ID setting process for +B is terminated.

Next, the ID setting process for ACC and the ID setting process for IG will be described. In the ID setting process for ACC and the ID setting process for IG, because the master device 2 is similar to the setting process for +B, the master device 2 will be briefly described. In the ID setting process for ACC and the ID setting process for IG, the master device 2 turns on the semiconductor relay 26 for ACC and the semiconductor relay 27 for IG, instead of turning on the semiconductor relay 25 for +B in step S11.

When power is supplied to the slave devices 3 for ACC and IG in response to the turning-on of the semiconductor relay 26 for ACC and the semiconductor relay 27 for IG, the slave devices 3 execute the above-described ID setting process.

Thereafter, the master device 2 executes the same processing as the steps S11 to S16 of the ID setting process for +B. However, in the ID setting process for ACC and the ID setting process for IG, instead of providing "01" indicating the +B power supply in step S15 as drive power information, the master device 2 adds "10", "11" indicating the ACC power supply and the IG power supply.

According to the embodiment described above, each of the plurality of slave devices 3 generates the slave unique information which is random information when setting the ID, and transmits the generated slave unique information to the master device 2. When all the slave unique information received from the plurality of slave devices 3 are different from each other, the master device 2 sets an ID based on each slave unique information, and if the slave unique information received from the plurality of slave devices 3 matches, the master device 2 transmits a slave unique information generation request which is an instruction to regenerate the slave unique information. When the slave device 3 receives the generation request, the slave device 3 re-creates the slave unique information. Thus, it is not necessary to assign an ID each time the slave device 3 is connected, so that it is possible to shorten the setting time of the ID and reduce erroneous setting.

According to the above-described embodiment, a plurality of slave devices 3 having a plurality of types (+B, ACC, IG) of different supply timing of the power supply is provided. The master device 2 supplies power to the plurality of slave devices 3 in turn for each type and sets IDs of the plurality of slave devices 3 in order of power supply for each type. Thus, even if the number of the slave devices 3 is large, ID setting is sequentially performed for each type of power supply, so the probability that the slave unique information coincides becomes low, and the setting time of the ID can be shortened.

According to the embodiment described above, the master device 2 sets the ID corresponding to each slave unique information. The master device 2 adds the ID set to the slave unique information and transmits it to the plurality of slave devices 3. Upon receiving the random information generated by the plurality of slave devices, the plurality of slave devices sets the received identification information as its own identification information. As a result, the slave device 3 can also set the ID corresponding to the slave unique information set by the master device 2.

According to the embodiment described above, a plurality of master devices 2 is installed in the vehicle 10, and the ID includes information indicating the installation position of the master device 2 in the vehicle. Thus, it is possible to easily assign different IDs to the slave devices 3 set in the vehicle 10.

According to the embodiment described above, the slave device 3 creates slave unique information if its own ID is a predetermined initial ID. Thereby, ID can be set automatically.

According to the embodiment described above, the slave device 3 adds the initial ID to the slave unique information and transmits the slave unique information, and when receiving the initial ID, the master device 2 sets the ID. Thereby, ID can be set automatically.

Incidentally, according to the above embodiment, the ID includes 4-bit slave type information different from the 7-bit slave unique information, but the present invention is not limited to this. For example, the same 4-bit slave unique information as the slave type information may be generated and added as the slave type information. However, when the number of the slave devices 3 is large, it is preferable to generate the slave unique information having a larger number of bits than the slave type information like this embodiment. Thereby, the probability of matching of the generated slave unique information is lowered, and the number of regeneration of the slave unique information is reduced, so that the ID setting can be shortened.

Further, according to the above-described embodiment, the master device 2 sequentially supplies the power to the slave devices 3 for +B, ACC, and IG, and sets the IDs in order, but the present invention is not limited to this. The master device 2 may simultaneously supply power to the slave devices 3 for +B, ACC, and IG, and set the IDs at the same time. However, when the number of the slave devices 3 is large, it is better to set the IDs in order like the present embodiment, since the probability of matching of the slave unique information decreases, the number of regeneration of the slave unique information is reduced, and it is possible to shorten the ID setting.

It should be noted that the present invention is not limited to the above embodiment. That is, various modifications can be made without departing from the gist of the present invention.

REFERENCE SIGNS LIST

1 in-vehicle network (communication system)
2 master device
3 slave device
24A CPU (first setting unit, second transmission unit, third transmission unit)
25-27 semiconductor relay (switch)
33A CPU (generation unit, first transmission unit, second setting unit)
301 slave device group for +B
302 slave device group for ACC
303 slave device group for IG

The invention claimed is:

1. A communication system comprising:
a plurality of slave devices; and
a master device that communicates with the plurality of slave devices,
wherein each of the plurality of slave devices includes: a generation unit that generates random information when setting identification information; a first transmission unit that transmits generated random information, and a memory,
wherein the master device includes: a first setting unit that sets the identification information based on each piece of the random information when all the pieces of the random information received from the plurality of slave devices are different; and a second transmission unit that transmits a regeneration command of the random information if the random information received from the plurality of slave devices includes information equivalent to each other, wherein the generation unit generates the random information again upon receiving the regeneration command,
wherein the first setting unit sets the identification information corresponding to each piece of the random information,
wherein the master device includes a third transmission unit that adds the set identification information to the random information and transmits the random information,
wherein the plurality of slave devices has a second setting unit that sets the received identification information as its identification information when receiving the random information generated by itself,
wherein the slave device firstly reads the identification information stored in the memory, determines whether the read identification information is initial determination information, and upon a determination that the read identification information, is initial identification information, the generation unit generates the random information.

2. The communication system as claimed in claim 1,
wherein a plurality of types of slave device groups each including the plurality of slave devices are provided,
Wherein the master device is provided for each of the plurality of slave device groups, and includes a switch provided for each of the plurality of slave device groups and supplying power to the corresponding slave device group, and
wherein the master device turns on the switches sequentially and causes the first setting unit to sequentially set the identification information of the plurality of slave devices for each of the slave device groups.

3. The communication system as claimed in claim 2,
wherein the slave device generates the random information if its own identification information is predetermined initial identification information.

4. The communication system as claimed in claim 3,
wherein the first transmission unit adds the initial identification information to the random information and transmits the added random information, and
wherein upon receiving the initial identification information, the master device causes the first setting unit to set the identification information.

5. The communication system as claimed in claim 1,
wherein a plurality of the master devices is installed in a vehicle, and
wherein the identification information includes installation information indicating an installation position of the master device in the vehicle.

6. The communication system as claimed in claim 5,
wherein the slave device generates the random information if its own identification information is predetermined initial identification information.

7. The communication system as claimed in claim 6,
wherein the first transmission unit adds the initial identification information to the random information and transmits the added random information, and
wherein upon receiving the initial identification information, the master device causes the first setting unit to set the identification information.

8. The communication system as claimed in claim 1,
wherein the slave device generates the random information if its own identification information is predetermined initial identification information.

9. The communication system as claimed in claim 8,
wherein the first transmission unit adds the initial identification information to the random information and transmits the added random information, and
wherein upon receiving the initial identification information, the master device causes the first setting unit to set the identification information.

* * * * *